United States Patent
Legg et al.

(10) Patent No.: US 11,395,193 B2
(45) Date of Patent: Jul. 19, 2022

(54) WIRELESS COMMUNICATION TO A VEHICLE

(71) Applicant: BluWireless Technology Limited, Bristol (GB)

(72) Inventors: Peter Jonathon Legg, Bristol (GB); Stuart Ryan, Bristol (GB); Hanan Moller, Bristol (GB)

(73) Assignee: BluWireless Technology Limited, Bristol (GB)

( * ) Notice: Subject to any disclaimer, the term of this patent is extended or adjusted under 35 U.S.C. 154(b) by 189 days.

(21) Appl. No.: 16/771,424

(22) PCT Filed: Dec. 18, 2017

(86) PCT No.: PCT/EP2017/083406
§ 371 (c)(1),
(2) Date: Jun. 10, 2020

(87) PCT Pub. No.: WO2019/120479
PCT Pub. Date: Jun. 27, 2019

(65) Prior Publication Data
US 2021/0185493 A1 Jun. 17, 2021

(51) Int. Cl.
*H04W 36/00* (2009.01)
*H04W 76/12* (2018.01)
(Continued)

(52) U.S. Cl.
CPC ..... *H04W 36/0027* (2013.01); *B61L 15/0027* (2013.01); *B61L 27/70* (2022.01); *H04W 4/40* (2018.02); *H04W 76/12* (2018.02)

(58) Field of Classification Search
CPC ... H04W 4/40; H04W 36/0027; H04W 76/12; H04W 4/42; H04W 80/06;
(Continued)

(56) References Cited

U.S. PATENT DOCUMENTS 10,091,024 B2 * 10/2018 Giroud ................. H04L 12/437
2010/0027419 A1 2/2010 Padhye
(Continued)

FOREIGN PATENT DOCUMENTS

CN 102413520 A 4/2012
CN 102413520 A1 4/2012
(Continued)

OTHER PUBLICATIONS

Costin Raiciu et al: "Opportunistic mobility with multipath TCP", Compilation Proceedings of the 9th International Conference on Mobile Systems, Applications, and Services & Co-Located Workshops : NSDR'II, MSC'II, Mobiarch'II and Hotplanet'II; Jun. 28-Jul. 1, 2011, Bethesda, MD, USA, ACM, New York; US, Jun. 28, 2011 (Jun. 28, 2011), pp. 7-12, XP058004540, DOI: 10.1145/1999916.1999919 ISBN: 978-1-4503-0740-6 p. 8.
(Continued)

*Primary Examiner* — Tejis Daya
(74) *Attorney, Agent, or Firm* — Optimus Patents US, LLC

(57) ABSTRACT

A wireless communication system supports communication between an end node of a vehicle and a correspondent node via a fixed network and wireless modems located with the vehicle. The fixed network comprises a mobility anchor being a common mobility anchor for the wireless modems and performing individual mobility management for each wireless modem, the mobility management for a wireless modem including determining communication paths from the mobility anchor to the wireless modem. A multipath proxy couples a proxy connection for the correspondent node to a plurality of subflows, each subflow being associated with one wireless modem and with the communication path determined by the mobility anchor, at least two of the subflows having communication paths via different wireless
(Continued)

modems. The wireless modems are arranged to connect the end node and the plurality of subflows.

13 Claims, 2 Drawing Sheets

(51) Int. Cl.
*H04W 4/40* (2018.01)
*B61L 15/00* (2006.01)
*B61L 27/70* (2022.01)

(58) Field of Classification Search
CPC .. B61L 15/0027; B61L 27/70; B61L 27/0005; H04L 69/14; H04L 67/12
See application file for complete search history.

(56) References Cited

U.S. PATENT DOCUMENTS

| | | | | |
|---|---|---|---|---|
| 2013/0215747 | A1* | 8/2013 | Jia | H04L 45/24 370/257 |
| 2016/0197767 | A1* | 7/2016 | Raeder | H04L 41/0654 370/242 |
| 2016/0269964 | A1* | 9/2016 | Murray | H04W 36/08 |
| 2016/0366049 | A1* | 12/2016 | Achouri | H04L 69/16 |
| 2017/0245192 | A1* | 8/2017 | Sadri | H04W 36/0005 |
| 2021/0143890 | A1* | 5/2021 | Legg | H04B 7/0617 |

FOREIGN PATENT DOCUMENTS

| | | | |
|---|---|---|---|
| CN | 103916918 A | 7/2014 | |
| CN | 103916918 A1 | 7/2014 | |
| EP | 2755440 A1 * | 7/2014 | ............ H04B 7/024 |
| WO | 2012097567 A1 | 7/2012 | |
| WO | 2015075569 A1 | 5/2015 | |
| WO | 20150075569 A1 | 5/2015 | |
| WO | 2015094043 A1 | 6/2015 | |
| WO | 20150094043 A1 | 6/2015 | |
| WO | 2016011011 A1 | 1/2016 | |
| WO | 2016018183 A1 | 2/2016 | |
| WO | WO-2016032359 A1 * | 3/2016 | ............ H04W 16/28 |

OTHER PUBLICATIONS

Costin Raiciu et al: "Opportunistic mobility with multipath TCP", Compilation Proceedings of the 9th International Conference on Mobile Systems, Applications, and Services & CO-Located Workshops, Jun. 28-Jul. 1, 2011, Bethesda, MD, USA, ACM, New York, US. Jun. 28, 2011, pp. 7-12, XP058004540, ISBN: 978-1-4503-0740-6, p. 8.

* cited by examiner

WIRELESS COMMUNICATION TO A VEHICLE

FIELD OF THE INVENTION

The invention relates to wireless communication to a vehicle, and in particular, but not exclusively, to wireless communication to a train based on the Internet Protocol.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5.0 GHz band. One variant is known as IEEE 802.11ad and this further expands the standard to support communications in the 60 GHz band.

A particular difficult challenge for a communication infrastructure is to support mobility. In particular, it is difficult to provide high data rate support for fast moving vehicles, such as for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving stations, such as fast moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in already used frequency ranges. This in particular applies to both cellular and Wi-Fi based wireless communication systems. It is therefore desirable to exploit less used frequency bands and there is substantial interest in providing high capacity support of fast moving vehicles using millimetre-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

Hence, an improved approach for supporting communication with fast moving vehicles would be advantageous. In particular, an approach that allows improved operation, improved reliability, increased flexibility, facilitated implementation, facilitated operation, improved resource utilisation, and/or improved support for communication with vehicles would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a wireless communication system for supporting communication between an end node of a vehicle and a correspondent node; the communication system comprising: a fixed network; a plurality of wireless modems for supporting wireless communication between end nodes of the vehicle and the fixed network, the plurality of wireless modems being located with the vehicle; wherein the fixed network comprises: a plurality of stationary wireless access points for providing wireless communication links to the plurality of wireless modems; a mobility anchor being a common mobility anchor for the plurality of wireless modems and arranged to perform individual mobility management for each wireless modem of the plurality of wireless modems, the mobility management for a wireless modem including determining communication paths from the mobility anchor to the wireless modem; a first multipath proxy for coupling a proxy connection for the correspondent node to a plurality of subflows, each subflow being associated with one wireless modem of the plurality of wireless modems and with the communication path determined by the mobility anchor for the one wireless modem, at least two of the subflows having communication paths via different wireless modems; and wherein the wireless modems are arranged to connect the end node and the plurality of subflows subflows and the mobility anchor and the first multipath proxy are co-located.

The invention may provide improved operation and support for mobility in many communication systems. The approach may be particularly suitable for supporting fast moving mobile communication devices using short range and/or very high frequency air interface wireless radio links, such as e.g. supporting data communication from trains using 60 GHz wireless links.

The multipath proxy and mobility anchor may provide a closely integrated and synergistic operation which allows improved support for fast mobile communication. The approach may for example allow network level implementation of effective air interface diversity.

The end node and/or wireless modems may be in/on/attached to/move with etc the vehicle, and may be part of a mobile network that moves with the vehicle.

A complementary multipath proxy operation combining the subflows of the multipath proxy may be implemented on the vehicle side of the wireless links, such as e.g. by the end node, a wireless modem, or often by a specific complementary multipath proxy implemented in a network node of the mobile network. The term mobile node may include a node of a network on the vehicle side of the wireless communication links, including the end node and the wireless modems.

According to an optional feature of the invention, the communication system further comprises a second multipath proxy for coupling the plurality of subflows to a proxy connection for the end node, the second proxy being located with the vehicle.

According to an optional feature of the invention, the proxy connection for the correspondent node is linked to a first wireless modem of the plurality of wireless modems and the first multipath proxy is arranged to forward a datagram addressed to the first wireless modem to a second wireless modem of the plurality of wireless modems.

According to an optional feature of the invention, the multipath proxy is arranged to change the subflows in response to the mobility management.

According to an optional feature of the invention, the first multipath proxy is arranged to select a subflow for a datagram received from the correspondent node in response to a status of the communication link for wireless links of the wireless modems of the communication paths of the subflows.

According to an optional feature of the invention, the mobility anchor is arranged to change a communication path for a subflow from including a first wireless modem to including a second wireless modem in response to a detection that a wireless link for the first wireless modem is inactive.

According to an optional feature of the invention, the mobility anchor is arranged to determine communication paths to the wireless modems in response to signalling received from at least one of a wireless access point and a mobile access gateway.

The end node and wireless modems may be co-moving with the vehicle such that any movement of the vehicle will impart a motion to the end node and wireless modems, and the end node and wireless modems may accordingly be substantially co-moving According to an optional feature of the invention, the mobility anchor comprises a network address table arranged to map between an address of a wireless modem for a communication path and a local address of the end node.

According to an optional feature of the invention, the mobility anchor and the first multipath proxy are arranged to communicate using a tunnel network connection.

According to an optional feature of the invention, the communication system further comprises an additional multipath proxy for coupling a proxy connection for a second node to a second plurality of subflows and wherein a communication path determined by the mobility anchor for a first wireless modem is used by subflows for the first wireless modem of both the first multipath proxy and the additional multipath proxy.

According to an optional feature of the invention, the first multipath proxy comprises a MultiPath Transmission Control Protocol, MPTCP, proxy.

According to an optional feature of the invention, the mobility anchor is arranged to perform individual Proxy Mobile IP mobility management for each wireless modem.

According to an aspect of the invention, there is provided a network node for a wireless communication system for supporting communication between an end node of a vehicle and a correspondent node; the communication system comprising: a fixed network; a plurality of wireless modems for supporting wireless communication between end nodes of the vehicle and the fixed network, the plurality of wireless modems being located with the vehicle; wherein the fixed network comprises
a plurality of stationary wireless access points for providing wireless communication links to the plurality of wireless modems; the network node comprising: a mobility anchor being a common mobility anchor for the plurality of wireless modems and arranged to perform individual mobility management for each wireless modem of the plurality of wireless modems, the mobility management for a wireless modem including determining communication paths from the mobility anchor to the wireless modem; and a first multipath proxy for coupling a proxy connection for the correspondent node to a plurality of subflows, each subflow being associated with one wireless modem of the plurality of wireless modems and with the communication path determined by the mobility anchor for the one wireless modem, at least two of the subflows having communication paths via different wireless modems.

According to an aspect of the invention, there is provided a method of operation for a wireless communication system supporting communication between an end node of a vehicle and a correspondent node; the communication system comprising: a fixed network; a plurality of wireless modems supporting wireless communication between end nodes of the vehicle and the fixed network, the plurality of wireless modems being located with the vehicle; wherein the fixed network comprises: a plurality of stationary wireless access points providing wireless communication links to the plurality of wireless modems; the method comprising: a mobility anchor, being a common mobility anchor for the plurality of wireless modems, performing individual mobility management for each wireless modem of the plurality of wireless modems, the mobility management for a wireless modem including determining communication paths from the mobility anchor to the wireless modem; a first multipath proxy coupling a proxy connection for the correspondent node to a plurality of subflows, each subflow being associated with one wireless modem of the plurality of wireless modems and with the communication path determined by the mobility anchor for the one wireless modem, at least two of the subflows having communication paths via different wireless modems; and the wireless modems connecting the end node and the plurality of subflows and wherein the mobility anchor and the first multipath proxy are co-located.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
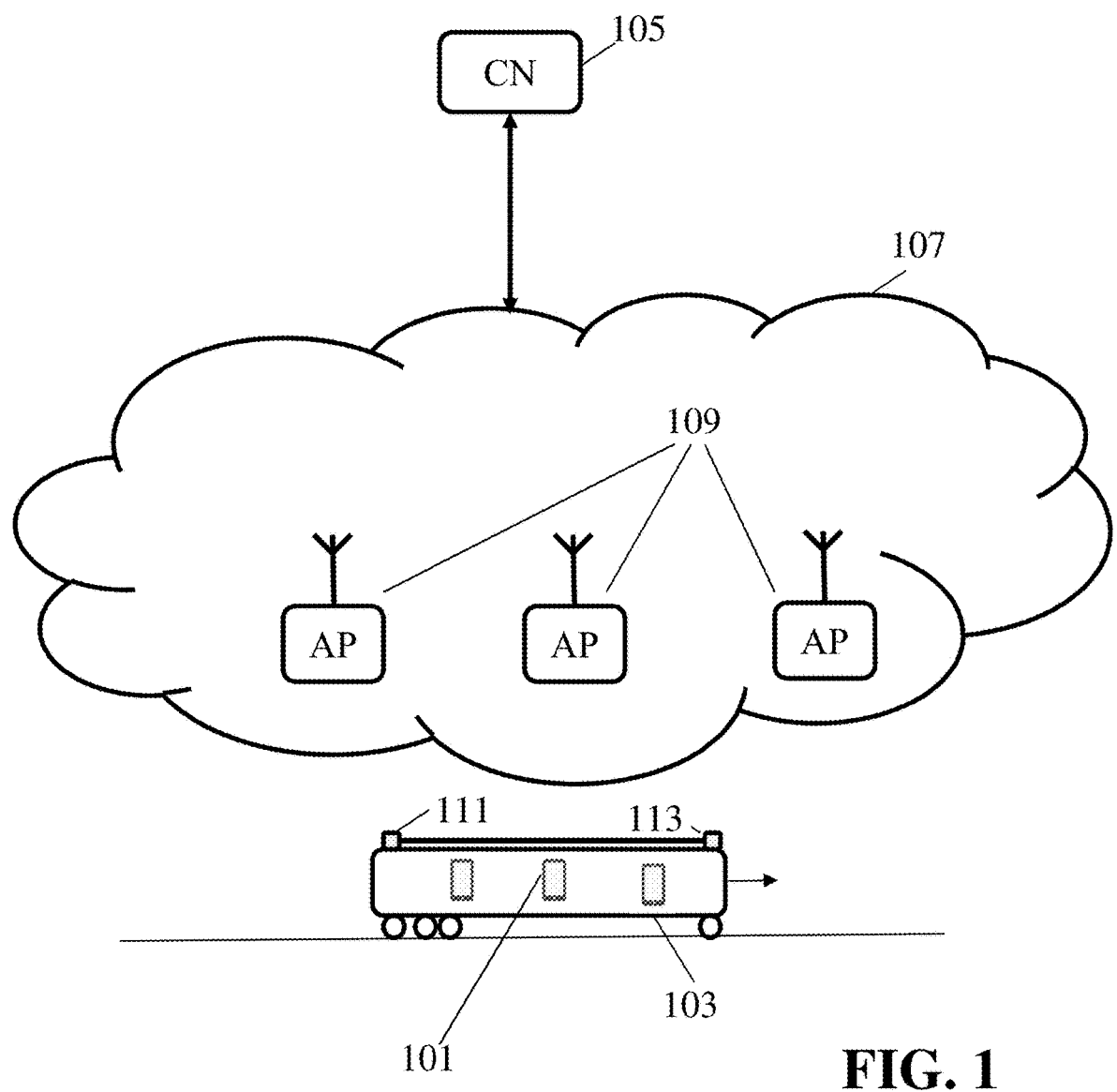
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1 a communication session is established between a correspondent node 105 and an end node 101 located in a train/vehicle 103. It will be appreciated that references to an entity being at/with/in/on etc a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the end node 105 is supporting a web browser accessing an Internet site supported by a server on the corresponding node 105.

The communication session is supported by a fixed network 107 which may specifically be a complex network comprising routers, switches, management nodes, mobility controllers, modems etc as will be known to the skilled person. In the example, the fixed network 107 is a Wide Area Network, WAN, based on the Internet Protocol (IP).

The correspondent node 105 is coupled to the fixed network 107 through a communication connection which supports the communication session with the end node 101. The communication connection is in the example an IP connection and may be established using any suitable means, such as e.g. by a direct connection of a device comprising the correspondent node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet.

The coupling of the fixed network 107 to nodes on the train 103 is supported by wireless communication links. For this purpose, the fixed network 107 comprises a plurality of wireless access points 109 which in the specific example may be a relatively large number of stationary access points positioned along the train tracks.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication may be used. For example, the wireless links may be formed by radio communications using the 60 GHz frequency band.

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m-1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to connect to will tend to change quickly, e.g. for a train moving along train tracks at a potentially high speed. Furthermore, the directional radio beam of the wireless modems 111, 113 can not necessarily be steered over all directions, but is limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 as the vehicle/train 103 moves.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and in particular in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train. The approach will be described in more detail with reference to FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

Figure 2:
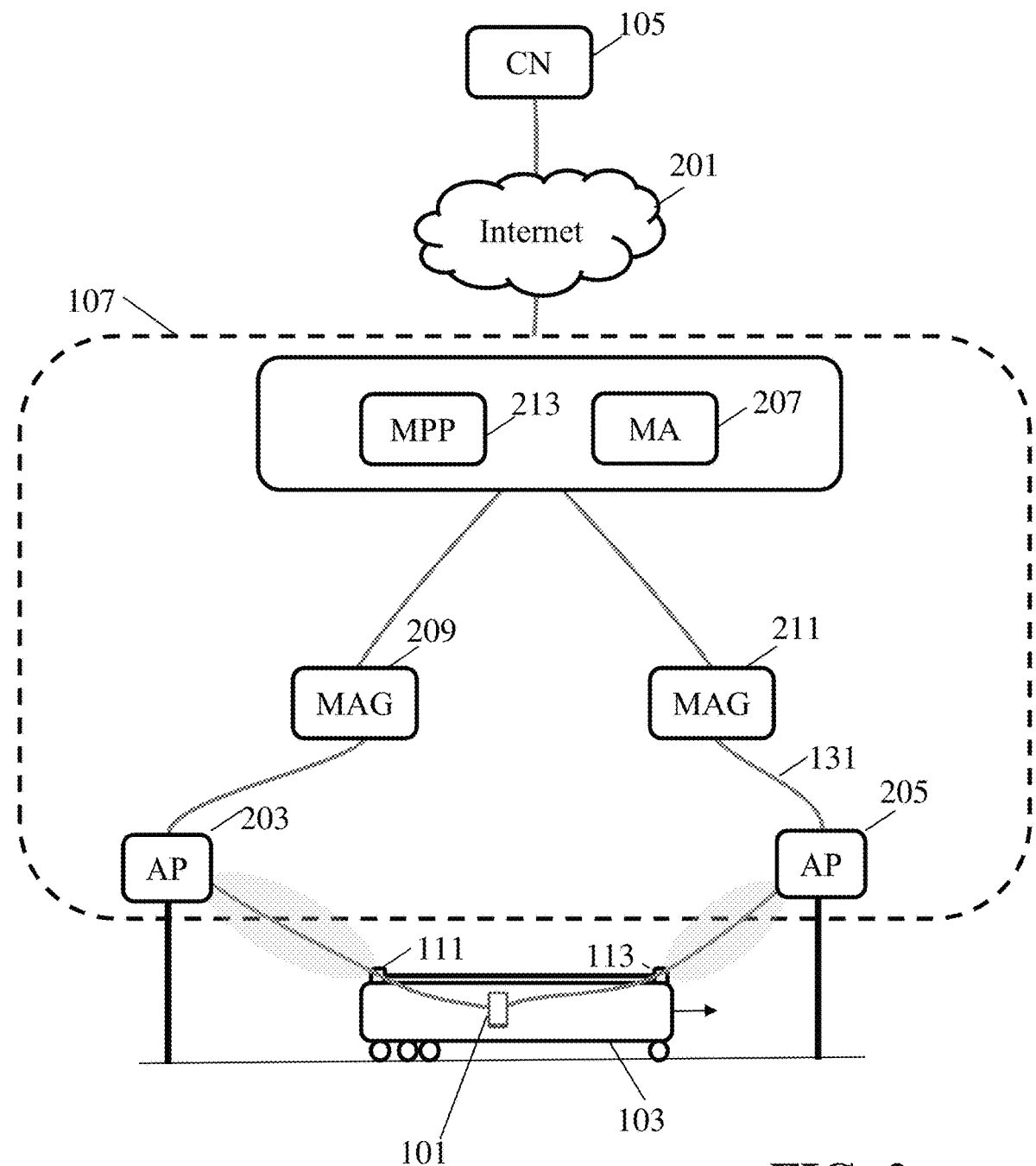
FIG. 2 illustrates an example of elements of a wireless communication system in accordance with some embodiments of the invention.

FIG. 2 illustrates a specific situation in which the train 103 has simultaneous access to a first access point 203 and a second access point 205 of the access points 109 via first and second modems of the wireless modems 111, 113. In the specific situation, a first wireless modem 111 has established a wireless link with the first access point 203 and the second wireless modem 113 has established a wireless link with the second access point 205.

The end node 101 and corresponding node 103 have established a communication session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 comprises a mobility anchor 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 (currently) support the communication.

Accordingly, all data from the correspondent node 105 to the end node 101 for the communication session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the communication session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113/the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a mobile access gateway 209, 211. Each mobile access gateway 209, 211 is typically linked with a plurality but not all of the access points 209, 211.

The use of a mobile access gateway (MAG) 209, 211 may typically facilitate mobility management as it allows the mobility anchor 207 to relatively easily change the communication path when handovers occur. For example, the mobility anchor 207 may implement a bidirectional tunnel connection to the appropriate mobile access gateway 209, 211 for a given connection, with the mobile access gateway 209, 211 then routing datagrams from/to the appropriate access point 109.

The fixed network 107 may specifically be an IP based network and may exploit many of the techniques and principles known from such IP networks. Specifically, the mobility anchor 207 may implement a Proxy Mobile IPv6 (PMIP) mobility management function.

The mobility anchor 207 is involved in IP address allocation for the modems 111, 113, when they first establish a wireless connection to an access point 109 (AP). Once a wireless connection has been established, a wireless modem 111, 113 will send a message to the fixed network 109 (for example, a router solicitation message), and the MAG connected to the AP of the wireless connection will send a message to the mobility anchor 207 to request a context or binding establishment at the anchor. The context is a list of parameters related to a single modem, and stores for example the identity of the MAG to which the modem is reachable. In PMIP, the message would be a proxy binding update. The mobility anchor establishes the context and returns a set of IP addresses (the 'prefix') to the MAG. The MAG and AP establish a bi-directional tunnel to carry traffic to and from the modem. The tunnel is a mechanism to carry any IP traffic from the MA to the MAG when its destination address matches a prefix address, and traffic from the MAG to the MA in the reverse direction. The modem chooses an IP address (or multiple addresses) from the prefix.

When the modem does a handover and connects to an AP linked to a different MAG from the current MAG, the MAG contacts the MA to inform it that the modem has moved MAGs (in PMIP this is a proxy binding update). The tunnel for the modem is now switched from the MA to the new MAG. Since the MA captures incoming traffic destined for the modem, it can be seen that the path from the CN to the modem is maintained continuously.

The modem can maintain the same IP address as it moves, establishing connections with different APs. This is true even if the modem has no wireless connection for a considerable time (multiple seconds) provided that the binding is maintained at the MA. The lifetime included in the initial proxy binding update message should preferably in many embodiments exceed the maximum time of disconnection over the train's journey.

The mobility anchor 207 is accordingly a common mobility anchor for a plurality of the wireless modems 111, 113 of the train 103, and typically for all of the wireless modems 111, 113.

Further, the mobility management of the mobility anchor 207 is performed individually for each of the wireless modems 111, 113 for which the mobility anchor 207 is an anchor.

Accordingly, the mobility anchor 207 is arranged to determine a communication path individually for each wireless modem 111, 113 and different wireless modems 111, 113 may at a given time have different paths/routes, and specifically may have different paths that involve different access points 109, and even different mobile access gateway 209, 211.

E.g. in the example of FIG. 2, the first wireless modem 111 is currently coupled to the first access point 203 and the second wireless modem 113 is coupled to the second access point 205. The first access point 203 is coupled to a first mobile access gateway 209 and the second access point 205 is coupled to a second mobile access gateway 211. Thus, the same mobility anchor 207 individually tracks two different paths to the train 103. In the example of FIG. 2, the train 103 is moving towards the second access point 205 and accordingly the first wireless modem 111 will proceed to handover from the first access point 203 to the second access point 205. This will result in the connection now being via not only the second access point 205 but also via the second mobile access gateway 211. The mobility anchor 207 will be notified of the new connection and will proceed to update the communication paths stored for the connection.

Thus, the mobility management of the mobility anchor 207 continuously and dynamically keeps tracks of the wireless modems 111, 113 and maintains a communication path to each of the wireless modems 111, 113. Further, this is done individually for each wireless modem 111, 113 (it will be appreciated that in addition to the set of a plurality of wireless modems 111, 113 for which individual mobility management is performed there may potentially be other wireless modems at the vehicle which are not individually tracked (e.g. operating as a slave to one of the individually tracked modems)).

In addition to the mobility anchor 207, the fixed network 107 further comprises a multipath proxy 213 which is arranged to couple a proxy connection for the correspondent node 105 to a plurality of subflows with each subflow being associated with one wireless modem of the plurality of wireless modems. Thus, a single proxy connection established between the multipath proxy 213 and the correspondent node 105 is divided out into multiple subflows between the multipath proxy 213 and the wireless modems 111, 113, and from these to the end node 101.

Each of the subflows has an associated communication path to the corresponding wireless modem 111, 113 and the multipath proxy 213 is arranged to support subflows having communication paths via different wireless modems. Accordingly, a plurality of subflows may be used to traverse the air interface between the fixed network 107 and the train 103 and with these subflows being supported by different wireless modems 111, 113.

The communication paths for the subflows are determined by the mobility management of the mobility anchor 207. Thus, for each of wireless modems 111, 113 (or at least each active modem involved in a communication session via the mobility anchor 207), the mobility anchor 207 maintains communication path information. Each of the subflows maintained by the multipath proxy 213 is associated with a wireless modem 111, 113 and thus for each subflow, the mobility anchor 207 maintains a communication path to the train.

The subflows may be combined by a suitable node or entity at the train. Specifically, in many embodiments, the end node 101 itself may be simultaneously connected to each of the plurality of wireless modems 111, 113 and may be arranged to combine datagrams received from different modems. In other embodiments, a corresponding complementary multipath proxy may be included on the train and this complementary multipath proxy may be arranged to combine the subflows into a single proxy connection to the end node 101.

The approach accordingly provides a system wherein individual mobility management for individual wireless modems 111, 113 is combined with a multipath proxy approach for communicating with the mobile entities. The multipath proxy 213 and mobility anchor 207 provide a closely integrated and synergistic operation which allows improved support for fast mobile communication.

The approach is particularly suited for systems with small distances between access points and with fast moving vehicles, such as the described 60 GHz based system for supporting communications with trains. The approach allows a highly efficient operation in systems wherein suitable access points for different modems relatively quickly and frequently pop into range and then are out of reach of the modem. It is highly suited for systems wherein the pool of suitable access points for a vehicle (e.g. train) is fast changing due to fast varying wireless conditions.

Indeed, in such systems, it is typically very impractical to continuously monitor and react to changes in radio conditions (as e.g. is known from cellular mobile systems). As radio conditions change very fast for higher frequency and increasing speeds, individual mobile entity controlled or dependent handovers can typically not be implemented sufficiently quickly and reliably to in itself provide sufficient performance. Further such approaches are complex and require substantial signalling.

The current approach may provide for a network based approach to address the challenges posed, and specifically it may provide a network based air interface diversity approach that allows very efficient performance for fast moving vehicles and (relatively) short range radio links. The approach can furthermore be implemented with low complexity and does not require large overheads or resource usage. It may also require little or no modifications to many nodes of the communication system.

The multipath proxy 213 may for example comprise a MultiPath Transmission Control Protocol, MPTCP, proxy (as e.g. described in the Internet Engineering Task Force (IETF) RFC 6824 and US2016/0366049A1) which can provide functionality for mapping a single proxy connection to a plurality of subflows. In the system, each of the generated subflows is not merely a path/connection through the network but is specifically linked with a specific wireless modem 111, 113 and thus it represents/is linked to a specific wireless communication link across the air interface. Further, each subflow is individually mobility managed by the mobility anchor 207 thereby allowing the multipath proxy 213 to provide air interface diversity from a network level operation.

Specifically, the multipath proxy can use MPTCP in which case the subflows are individual TCP subflows that operate to the MPTCP termination point. There is a MPTCP instance for each application running on the end node 101 which requires a TCP socket connection. The MPTCP may be terminated in the end node 101 when it operates a native MPTCP protocol stack. Alternatively, a second MPTCP proxy located on the train can terminate MPTCP, with an additional communication link to the end node 101. For example, this additional link could be over a wireless LAN (WLAN) located on the train. The additional link may involve multiple hops over intermediate network nodes, for example, via a wireless router or a WLAN access point. MPTCP supports several mechanisms to add and remove subflows. When a modem loses connectivity with an AP, for example, when it moves out of range and no immediate handover to another AP is possible, the subflow may be maintained or torn down. When the same modem later re-establishes a wireless connection the TCP subflow can be used again, if it was maintained, or if it was torn down it can be re-established.

Using multiple flows over multiple modems allows connectivity to be maintained to the train (and end node 101) as modems connect and disconnect, by maintaining at least one modem connection at any point in time (make before break operation). It should be noted that typically the connection and disconnection of modems is a consequence of the limited range and steerability of the modem to AP links, coupled with the design objective of maximising the separation of adjacent APs.

Each MPTCP instance is able to transmit packets over any of the subflows that are active, according to the scheduling principle it employs. This includes redundancy operation in which a packet is sent over multiple subflows at the same time. The MPTCP receiver is able to reorder TCP segments by exploiting a MPTCP sequence number. It also generates MPTCP level acknowledgements that enable the transmitting MPTCP to resend packets.

The end application is unaware of the multipath operation. Furthermore, the coupling with the mobility management operation ensures there is no change to IP addresses as the vehicle moves, so there is no risk of session interruption or dropping.

The approach may provide a high degree of flexibility and improved performance while allowing compatibility with many existing approaches, algorithms, applications and devices. In particular, the close integration of a multipath proxy and mobility management allows effective and quick adapting air interface diversity without requiring complex processes and typically without requiring changes to the operation of other nodes, services, or devices.

Specifically, the correspondent node 105 may operate exactly as if it were serving a fixed client, and it need not have any knowledge that the communication session is with a mobile node. Nor does the correspondent node 105 need to be aware of any multipath operation but rather it simply communicates with the multipath proxy 213 using a single connection and a single IP address.

As an example, a passenger on the train may initiate a web browsing service and access a server at the correspondent node 105. This initial access may for example be routed to the correspondent node 105 via the first wireless modem 111, the first access point 203, the first mobile access gateway 209, and the mobility anchor 207. In response, a communication session may be setup in which the correspondent node 105 is provided with the address for the first wireless modem 111 as the address of the originating node (e.g. with a Network Address Translation, NAT, being located at the first wireless modem 111 for translating this into a local address for the end node 101).

The correspondent node 105 will accordingly proceed to address datagrams to the end node 101 using the address of the first wireless modem 111. The mobility anchor 207 will publish that it is a mobility anchor for the address of the first wireless modem 111 and will accordingly receive these datagrams. It will further perform mobility management for the first wireless modem 111 as well as for the second wireless modem 113 (and typically for all modems).

The received datagrams are passed to the multipath proxy 213 from mobility anchor 207. The multipath proxy 213 further receives mobility management information for the wireless modems 111, 113 allowing it to keep track of the routing/forwarding required for each individual modem.

The multipath proxy 213 implements a multipath proxy for the communication session with multiple subflows with different wireless modems 111, 113. E.g. the multipath proxy 213 may establish a subflow for the first wireless modem 111 and another subflow for the second wireless modem 113.

When the multipath proxy 213 receives a datagram addressed to the first wireless modem 111, it may now forward this datagram on one of the subflows. Some datagrams addressed to the first wireless modem 111 may accordingly not be forwarded on the subflow for the first wireless modem 111 but may be forwarded on the subflow for the second wireless modem 113.

Accordingly, although the datagram is addressed to the first wireless modem 111, it is transmitted across the air interface using the second wireless modem 113.

Accordingly, in a situation where the proxy connection for the correspondent node is linked to a first wireless modem 203, e.g. by the datagrams being addressed to the first wireless modem 111, the multipath proxy may forward some (or indeed in some scenarios possibly all) datagrams that are addressed to the first wireless modem 203 on a subflow linked to a different wireless modem.

The operation on the vehicle side of the system may be different in different embodiments and scenarios.

For example, in many embodiments, a complete network may be implemented in the train. Specifically, an IP based network may be implemented, such as e.g. a Wi-Fi based Local Area Network, LAN. In some such embodiments, each (or at least some of the) wireless modems 111, 113 may also be coupled to Wi-Fi access points for nodes on the train.

In some such embodiments, multiple connections may be established between the end node 101 and the wireless modems 111, 113. For example, a separate IP connection may be established between the end node 101 and each wireless modem 111, 113 which supports a subflow for the end node 101. In this case, each wireless modem 111, 113 receiving a datagram for the communication session established for the end node 101 and the correspondent node 105 may be arranged to forward this datagram directly to the end node 101 on the established IP connection. For example, if the second wireless modem 113 receives a datagram on a subflow from the multipath proxy 213, it will forward this directly to the end node 101 even if the datagram was addressed to the first wireless modem 111 by the correspondent node 105.

Such an approach may be considered to correspond to the end node 101 implementing a complementary multipath proxy to the one operating in the multipath proxy 213. The end node 101 may combine the data received from different wireless modems 111, 113 to a single data stream corresponding to the one transmitted by the correspondent node 105.

In other embodiments, the vehicle side network (the network at the vehicle side of the air interface) may comprise a second complementary multipath proxy which is arranged to combine the multiple subflows into a single proxy connection for the end node 101. In such an approach, the wireless modems 111, 113 may be arranged to forward datagrams to the complementary multipath proxy which will then be arranged to combine the received datagrams and forward them to the end node 101. In such an approach, the end node 101 accordingly simply establishes a single connection (to the complementary multipath proxy), and the network (the combination of the vehicle side network and the fixed network 107) performs the necessary operation to provide the mobility support based on network implemented air interface diversity.

In some embodiments, the complementary multipath proxy may effectively be linked to one of the wireless modems 111, 113. For example, the wireless modems 111, 113 may be coupled to each other, e.g. via a vehicle side network, and may be arranged to communicate data with each other. In such a case, the wireless modems 111, 113 may be arranged to forward datagrams received on a given subflow to the specific wireless modem 111, 113 that is addressed by the correspondent node 105. For example, the second wireless modem 113 may forward any datagrams received and addressed to the first wireless modem 111 to the first wireless modem 111. The first wireless modem 111 may then operate a complementary multipath proxy or may forward the data to a node that does so.

It will be appreciated that different approaches for providing multiple destination indications/addresses may be used in different embodiments, and specifically for identifying both e.g. a wireless modem and the end node. In some embodiments, this may for example be achieved using tunnelling. In other embodiments, port numbers may be used to identify the specific end node 101.

In other embodiments, the vehicle network may operate a NAT which is arranged to translate between the external address, being e.g. that of a specific wireless modem 111, 113, and the internal local address of the end node 101. A NAT may allow a large number of end nodes to be given individual IP addresses whilst the vehicle itself only presents a small number of external (routable) IP addresses to the mobility management. Individual end nodes are distinguished by the NAT operation by translating the source IP address of packets sent to one of the modem IP addresses and by assigning a TCP port number such that the combination of assigned external address and port number is unique for the vehicle. Translation takes place by NAT for incoming and outgoing packets. The CN receives packets with a source address set to one of the modem addresses.

It will be appreciated that the multipath proxy 213 may use different algorithms, criteria, and approaches for selecting which subflow to use for a given datagram.

Indeed, in some embodiments, the multipath proxy 213 may simply select a subflow at random or e.g. in accordance with a predetermined pattern. In such embodiments, datagrams that are not received at the end node 101 (or possibly the wireless modem 111, 113) may be requested to be retransmitted (either directly by the destination detecting a missing datagram and requesting this to be retransmitted, or indirectly by no acknowledgment being received when employing an acknowledgement and retransmit scheme). The retransmissions may in some embodiments again use a random or changing subflow and, in some embodiments, may be required to use a different subflow than the original transmission.

Such an approach will result in datagrams not being lost due to e.g. temporary losses of the corresponding wireless link but rather being retransmitted using air interface diversity.

In other embodiments, the multipath proxy 213 may adopt a more complex operation. Specifically, in some embodiments, the multipath proxy 213 may be arranged to select subflows for the datagrams in response to the statuses of wireless links associated with the subflows.

The status may for example be indicative of a current throughput or error rate for the wireless link of the given subflow.

This status may in some embodiments be determined by the multipath proxy 213 itself. For example, it may continuously for each subflow monitor whether datagrams are successfully acknowledged or not. If a large number of retransmissions are required on a subflow, it may be considered that the current throughput is low and that the current error rate is high. Accordingly, the weighting of this subflow may be reduced and other subflows may be weighted higher. Additionally, the multipath protocol on the vehicle may signal to the multipath proxy regarding the termination of a subflow or the priority or relative priority of a subflow(s). When the multipath protocol is MPTCP these could be carried by FIN and MPPRIO messages.

In other embodiments, the multipath proxy 213 may determine an indication of the wireless link status in response to signalling and data received from another node, such as specifically from one of the access points 109. For example, the access points 109 may measure a(n averaged) packet or bit error for the wireless links and may report this to the multipath proxy 213. The multipath proxy 213 may then prioritise the individual subflows in response to the measured error rate. In other embodiments the wireless link status may be represented by radio measurements such as received power, signal-to-noise-ratio etc.

An advantage of such adaptable selection of the subflows is that it allows a faster adaptation to the changing wireless conditions. As the train 103 moves from one access point towards the next, the multipath proxy 213 may adapt and start prioritising the subflow of the second access point 205 higher than the subflow of the first second access point 205 resulting in a softer transition and typically a reduced need for retransmissions etc.

In many embodiments, the multipath proxy 213 may further be arranged to change the subflows in response to the mobility management, and specifically may be arranged to remove a subflow and/or to add a subflow in response to the mobility management.

In many embodiments, the multipath proxy 213 may be arranged to do so in response to the mobility management detecting that a wireless link has changed from an active status to a passive status, typically corresponding to a change of a wireless link from performing acceptable to performing unacceptably (e.g. with respect to throughput, error rate, etc).

In some embodiments, the mobility management may for example detect that the condition of a wireless link has deteriorated to the point where it is not longer usable, and it may designate the wireless link as inactive. This decision may be indicated to the multipath proxy 213 which accordingly may proceed to remove the subflow from the list of subflows currently being used.

As an example of a possible operation, when the mobility anchor 207 becomes aware that a wireless link to a first modem is inactive, it may redirect traffic destined for the first wireless modem 111 to another wireless modem, e.g. the second wireless modem 113, that is known to be active. The tunnel to the inactive first wireless modem 111 may be moved to the active second wireless modem 113, and the packets whose destination address is equal to the first wireless modem 111 are pushed into the subflow originally in use and passed down the redirected tunnel. When the packets reach the second wireless modem 113 they are directed to the correct subflow termination (with MPTCP this would be the corresponding TCP instance).

In many embodiments, the mobility management is arranged to update communication paths for a mobile node (such as e.g. the end node 101 or the first wireless modem 111) in response to signalling from a wireless access point or e.g. from a mobile access gateway.

For example, the first wireless modem 111 may initially be coupled to the first access point 203. However, as the train moves, this link may deteriorate and as the train 103 approaches the second access point 205 the first wireless modem 111 may instead be able to access the second access point 205. This may be detected by the first wireless modem 111 which accordingly may transmit an access request message to the second access point 205. This may cause the second access point 205, or in some embodiments the associated mobile access gateway 211 to transmit a binding update to the mobility anchor 207 indicating that the first wireless modem 111 is now connected to the second access point 205.

In response to receiving such a binding update, the mobility management will update the determined communication path for the first wireless modem 111 to be via the second access point 205 rather than the first access point 203. Accordingly, subflows linked to the first wireless modem 111 will now be routed via the second access point 205 as the routing for the subflows of the multipath proxy 213 is based on the mobility management of the mobility anchor 207. However, in some embodiments, it may not be possible for a wireless modem 111, 113 to access a new access point 109 when a wireless link becomes unusable. In such a situation, it may be detected (by the mobility anchor 207 or by the multipath proxy 213 itself), that the link no longer supports communication and that it is inactive.

In response, the multipath proxy 213 may proceed to remove this subflow from the set of active subflows. However, in many embodiments, rather than simply removing the subflow, it may be desirable to replace it by a subflow which includes a different wireless modem. For example, as the train has moved, it may now be possible for a third wireless modem to access the second access point 205 (which it could not do before). This may be detected by the mobility management tracking all the wireless modems, and accordingly the mobility anchor 207 may inform the multipath proxy 213 of the new availability of the third wireless modem. In response, the multipath proxy 213 may proceed to change the previous subflow linked to the first wireless modem 111 to a new subflow linked to the third wireless modem.

The described approach is based on a close and synergistic interworking of the multipath proxy 213 and the mobility anchor 207 to provide very efficient network based support for fast moving vehicles and short distance access point communications. This synergistic interworking includes dynamic control and user data exchange between the multipath proxy 213 and the mobility anchor 207.

In particular, the multipath proxy 213 utilizes mobility information from the mobility management of the mobility anchor 207 and the routing of the individual subflows is based on the individual mobility management for the wireless modems 111, 113. Similarly, the mobility anchor 207 provides a single common anchor point for all data exchanges but with the connection between this anchor point and the mobile node being based on the multiple paths established by the multipath proxy 213. Thus, all data captured by the mobility anchor 207 and intended for the mobile node is via the multipath proxy 213 and thus the multipath proxy 213 may also be a fixed node that does not change as a function of the movement of the mobile node.

In many embodiments, the mobility anchor 207 and the multipath proxy 213 are co-located and thus efficient interworking is achieved. Indeed, a particular feature of the described approach is in many embodiments that a highly efficient mobility support with low overhead can be achieved by implementing co-located interworking mobile proxies and mobility anchors.

However, in some embodiments, the mobility anchor 207 and the multipath proxy 213 may not be co-located. For example, the mobility anchor 207 and the multipath proxy 213 may be positioned at different positions, nodes, and devices in the fixed network 107. In such embodiments, the mobility anchor 207 and the multipath proxy 213 may be arranged to communicate with each other using a tunnel network connection.

The tunnel may be used to ensure that all traffic from the mobility anchor 207 destined for any of the wireless modems is routed to the multipath proxy 213. This allows the multipath proxy 213 to schedule the incoming traffic between the multiple subflows. The tunnel can be unidirectional (anchor to proxy) or bidirectional. The traffic from the multipath proxy 213 to the MAGs is typically also tunneled, as described above for when the mobility anchor and multipath proxy are co-located. Therefore, in this configuration the functionality of the mobility anchor 207 and the multipath proxy 213 may specifically be mixed: the anchor advertises that it is able to reach the IP addresses of the wireless modems 111, 113 (not changed), it then establishes a single tunnel to the multipath proxy 213 which then establishes tunnels to all relevant MAGs. Another perspective on this architecture is the functionality of the mobility anchor which "attracts" IP traffic destined for the wireless modems 111, 113 can be detached from the mobility anchor 207 and placed in a separate node connected by a tunnel.

Alternatively, the mobility anchor 207 and multipath proxy 213 can be separated but linked by a single connection link or by one or more network nodes provided that traffic to/from the vehicle modems passes through both the mobile anchor 207 and the multipath proxy 213.

In some embodiments, the mobility anchor (207) may comprise a Network Address Table, NAT, arranged to map between an address for one of the wireless modems and a local address of the end node (101).

With a NAT in the fixed network, a local IP address may be used between the mobile node (typically a wireless modem) and the mobility anchor 207. At the mobility anchor 207 on the upstream (traffic to the correspondent node 105, CN), NAT would then take place, mapping the local source address to one of the modem addresses. In the downstream (traffic from the correspondent node 105, CN), incoming packets may typically have their destination address swopped to the local address, and passed over the subflows to MAGs. Delivery would then take place to the train. This method requires different trains attached to the same mobility anchor to be configured with non-overlapping local IP address ranges. The advantage of NAT in the network is that it moves complexity away from a train node to a centralised network node that can typically provide more resources, such as higher computing power or cloud computing.

The previous description has focused on a single communication session being supported. However, it will be appreciated that the approach may be used to simultaneously support a plurality of different communication sessions including sessions for different end nodes, users, and devices.

In such scenarios, the system may be arranged to employ multiple parallel multipath proxies, and specifically may e.g. establish a multipath proxy for each communication session or correspondent node connection. In a typical scenario, the network may accordingly simultaneously implement a potentially large number of mobile proxies each with a number of subflows. The total number of subflows may therefore be relatively large.

However, by performing individual mobility management for each wireless modem 111, 113, the mobility management for a given wireless modem 111, 113 may in many embodiments be reused for different multipath proxies having subflows using the same wireless modem 111, 113.

For example, the mobility anchor 207 may track the first wireless modem 111 and continuously determine a communication/routing path to use for any subflow that is linked to this first wireless modem 111. This mobility management is performed for the first wireless modem 111 rather than for the individual subflow. Accordingly all subflows of all multipath proxies that are linked to the first wireless modem 111 may use the same mobility management information, and specifically may use the same routing information and communication path.

This may result in a very efficient operation and may significantly reduce the required resource.

It will be appreciated that whereas the approach has been described with focus on applying the multipath proxy approach in communicating from the correspondent node 105 to the end node 101, the multipath proxy approach is also applicable to communication of data from the end node 101 to the correspondent node 105.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. A wireless communication system for supporting communication between an end node of a vehicle and a correspondent node; the communication system comprising:
a fixed network;
a plurality of wireless modems for supporting wireless communication between end nodes of the vehicle and the fixed network, the plurality of wireless modems being located with the vehicle;
wherein the fixed network comprises
a plurality of stationary wireless access points for providing wireless communication links to the plurality of wireless modems;
a mobility anchor being a common mobility anchor for the plurality of wireless modems and arranged to perform individual mobility management for each wireless modem of the plurality of wireless modems, the mobility management for a wireless modem including determining communication paths from the mobility anchor to the wireless modem;
a first multipath proxy for coupling a proxy connection for the correspondent node to a plurality of subflows, each subflow being associated with one wireless modem of the plurality of wireless modems and with the communication path determined by the mobility anchor for the one wireless modem, at least two of the subflows having communication paths via different wireless modems;
an additional multipath proxy for coupling a proxy connection for a second node to a second plurality of subflows;
and wherein the wireless modems are arranged to connect the end node and the plurality of subflows, the mobility anchor and the first multipath proxy are co-located; and
a communication path determined by the mobility anchor for a first wireless modem is used by subflows for the first wireless modem of both the first multipath proxy and the additional multipath proxy.

2. The communication system of claim 1, further comprising a second multipath proxy for coupling the plurality of subflows to a proxy connection for the end node, the second proxy being located with the vehicle.

3. The communication system of claim 1, wherein the proxy connection for the correspondent node is linked to a first wireless modem of the plurality of wireless modems and the first multipath proxy is arranged to forward a datagram addressed to the first wireless modem to a second wireless modem of the plurality of wireless modems.

4. The communication system of claim 1, wherein the multipath proxy is arranged to change the subflows in response to the mobility management.

5. The communication system of claim 1, wherein the first multipath proxy is arranged to select a subflow for a datagram received from the correspondent node in response to a status of the communication link for wireless links of the wireless modems of the communication paths of the subflows.

6. The communication system of claim 1, wherein the mobility anchor is arranged to change a communication path for a subflow from including a first wireless modem to including a second wireless modem in response to a detection that a wireless link for the first wireless modem is inactive.

7. The communication system of claim 1, wherein the mobility anchor is arranged to determine communication paths to the wireless modems in response to signalling received from at least one of a wireless access point and a mobile access gateway.

8. The communication system of claim 1, wherein the mobility anchor comprises a network address table arranged to map between an address of a wireless modem for a communication path and a local address of the end node.

9. The communication system of claim 1, wherein the mobility anchor and the first multipath proxy are arranged to communicate using a tunnel network connection.

10. The communication of claim 1, wherein the first multipath proxy comprises a MultiPath Transmission Control Protocol, MPTCP, proxy.

11. The communication of claim 1, wherein the mobility anchor is arranged to perform individual Proxy Mobile IP mobility management for each wireless modem.

12. A network node for a wireless communication system for supporting communication between an end node of a vehicle and a correspondent node; the communication system comprising:
a fixed network;
a plurality of wireless modems for supporting wireless communication between end nodes of the vehicle and the fixed network, the plurality of wireless modems being located with the vehicle; wherein the fixed network comprises:
a plurality of stationary wireless access points for providing wireless communication links to the plurality of wireless modems;
the network node comprising:
a mobility anchor being a common mobility anchor for the plurality of wireless modems and arranged to perform individual mobility management for each wireless modem of the plurality of wireless modems, the mobility management for a wireless modem including determining communication paths from the mobility anchor to the wireless modem;
a first multipath proxy for coupling a proxy connection for the correspondent node to a plurality of subflows, each subflow being associated with one wireless modem of the plurality of wireless modems and with the communication path determined by the mobility anchor for the one wireless modem, at least two of the subflows having communication paths via different wireless modems; and
an additional multipath proxy for coupling a proxy connection for a second node to a second plurality of subflows, and wherein a communication path determined by the mobility anchor for a first wireless modem is used by subflows for the first wireless modem of both the first multipath proxy and the additional multipath proxy.

13. A method of operation for a wireless communication system supporting communication between an end node of a vehicle and a correspondent node; the communication system comprising:
a fixed network;
a plurality of wireless modems supporting wireless communication between end nodes of the vehicle and the fixed network, the plurality of wireless modems being located with the vehicle;
wherein the fixed network comprises:
a plurality of stationary wireless access points providing wireless communication links to the plurality of wireless modems;
the method comprising:
a mobility anchor, being a common mobility anchor for the plurality of wireless modems, performing individual mobility management for each wireless modem of the plurality of wireless modems, the mobility management for a wireless modem including determining communication paths from the mobility anchor to the wireless modem;
a first multipath proxy coupling a proxy connection for the correspondent node to a plurality of subflows, each subflow being associated with one wireless modem of the plurality of wireless modems and with the communication path determined by the mobility anchor for the one wireless modem, at least two of the subflows having communication paths via different wireless modems;
an additional multipath proxy coupling a proxy connection for a second node to a second plurality of subflows; and the wireless modems connecting the end node and the plurality of subflows; and
wherein the mobility anchor and the first multipath proxy are co-located and a communication path determined by the mobility anchor for a first wireless modem is used by subflows for the first wireless modem of both the first multipath proxy and the additional multipath proxy.

* * * * *